(12) United States Patent
Clement et al.

(10) Patent No.: US 6,961,005 B2
(45) Date of Patent: Nov. 1, 2005

(54) ELECTRICAL APPARATUS COMPRISING A MONITORING DEVICE, SUPPORT AND MONITORING DEVICE FOR SUCH AN APPARATUS, AND ELECTRICAL INSTALLATION INCORPORATING THEM

(75) Inventors: Philippe Clement, Claix (FR); Leonard Didier, Seyssins (FR); Vernay Marc, Saint Martin d'Hères (FR)

(73) Assignee: Schneider Electric Industries SA, Rueil-Malmaison (FR)

( * ) Notice: Subject to any disclaimer, the term of this patent is extended or adjusted under 35 U.S.C. 154(b) by 602 days.

(21) Appl. No.: 09/917,757

(22) Filed: Jul. 31, 2001

(65) Prior Publication Data

US 2002/0021226 A1 Feb. 21, 2002

(30) Foreign Application Priority Data

Aug. 8, 2000 (FR) .................................. 00 10417

(51) Int. Cl.⁷ .......................... G08C 19/22; H04Q 9/00
(52) U.S. Cl. .............. 340/870.07; 340/644; 200/50.26; 307/38
(58) Field of Search ...................... 340/870.07, 870.28, 340/870.26, 10.1, 644; 200/50.01, 50.26; 307/38

(56) References Cited

U.S. PATENT DOCUMENTS

| | | | |
|---|---|---|---|
| 3,689,885 A | * | 9/1972 | Kaplan et al. ............. 340/10.1 |
| 3,914,762 A | * | 10/1975 | Klensch ...................... 340/5.61 |
| 5,113,184 A | * | 5/1992 | Katayama ................. 340/10.51 |
| 5,198,807 A | * | 3/1993 | Troyk et al. ............. 340/10.34 |
| 5,305,008 A | * | 4/1994 | Turner et al. .................. 342/44 |
| 5,309,310 A | * | 5/1994 | Baer et al. ..................... 361/42 |
| 5,861,683 A | * | 1/1999 | Engel et al. ................... 307/38 |
| 5,905,442 A | | 5/1999 | Mosebrook et al. ... 340/825.06 |
| 6,025,783 A | | 2/2000 | Steffens, Jr. ................ 340/644 |
| 6,087,957 A | * | 7/2000 | Gray ......................... 340/10.1 |
| 6,720,866 B1 | * | 4/2004 | Sorrells et al. ............ 340/10.4 |

FOREIGN PATENT DOCUMENTS

DE        41 12 625 A1    10/1992

\* cited by examiner

Primary Examiner—Timothy Edwards, Jr.
(74) Attorney, Agent, or Firm—Steptoe & Johnson LLP

(57) ABSTRACT

An electrical apparatus including electrical components, wherein at least one of the electric components is a monitoring device including electromagnetic radiation receiving means connected to at least one sensor, the electromagnetic radiation receiving means for receiving electromagnetic radiation from electromagnetic emitting means, wherein the electromagnetic radiation receiving means are located on a side of the electrical apparatus and are for being directed towards a support including means for emitting an electromagnetic radiation, and the electromagnetic radiation receiving means is for supplying electrical power upon receipt of electromagnetic radiation from such means for emitting electromagnetic radiation located on such support.

51 Claims, 8 Drawing Sheets

ELECTRICAL APPARATUS COMPRISING A MONITORING DEVICE, SUPPORT AND MONITORING DEVICE FOR SUCH AN APPARATUS, AND ELECTRICAL INSTALLATION INCORPORATING THEM

BACKGROUND OF THE INVENTION

The invention relates to an electrical apparatus comprising electrical components and a monitoring device of at least one of said electrical components, a support and a monitoring device for such an apparatus, and an electrical installation comprising such an electrical apparatus, such a support or such a monitoring device.

STATE OF THE ART

State-of-the-art electrical apparatuses such as switches or circuit breakers comprise auxiliary circuits to give a remote indication of the states of said apparatuses. These auxiliary circuits are generally connected on the sides of the apparatuses or arranged in said apparatuses. In known manner, these circuits are contacts used to perform local or remote indication of the states of said apparatuses in an electrical installation.

Installation of electrical apparatuses associated to auxiliary circuits requires a large amount of wiring comprising a large number of connecting wires. Furthermore, when the electrical apparatuses are modular to be fitted in a switchboard or a cabinet equipped with supports in the form of rails, the auxiliary circuits occupy a large number of modules. As the auxiliary circuits are generally used to perform indication, these circuits must be perfectly isolated electrically from the main circuits of the electrical apparatuses. The auxiliary circuits thus comprise connection terminals of large size isolated from the circuits of the apparatuses to which they are associated.

OBJECT OF THE INVENTION

The object of the invention is to achieve an electrical apparatus comprising a monitoring device avoiding the use of auxiliary circuits incorporated in said apparatus and guaranteeing electrical isolation, a support and monitoring device for such an apparatus, and an electrical installation comprising said apparatus, said support, and/or said device.

An electrical apparatus according to the invention comprises a monitoring device comprising electromagnetic receiving means connected to at least one sensor, the electromagnetic receiving means being designed to receive an electromagnetic radiation from electromagnetic emitting means.

In a preferred embodiment, the monitoring device comprises load variation means connected to the electromagnetic receiving means to send a monitoring signal by modifying the electromagnetic radiation when an electromagnetic radiation is received.

Advantageously, the electromagnetic receiving means supply electrical power when they receive an electromagnetic radiation.

In a particular embodiment, the monitoring device comprises at least one display device designed to be supplied by the electromagnetic receiving means to display the state of at least one sensor when an electromagnetic radiation is received by said electromagnetic receiving means.

Advantageously, the electromagnetic receiving means comprise at least one electromagnetic induction coil.

According to an alternative embodiment, the electromagnetic receiving means comprise at least one antenna.

Preferably, the electromagnetic receiving means comprise a circuit tuned to a frequency appreciably equal to a frequency of the electromagnetic radiation.

Advantageously, the electromagnetic receiving means are arranged in at least one side wall of the electrical apparatus.

Preferably, the electromagnetic receiving means are arranged on a back plate of the electrical apparatus and are designed to be directed towards a support comprising means for emitting an electromagnetic radiation.

In a particular embodiment, the apparatus comprises an electrical switch and a sensor supplying a signal representative of the state of said switch to the monitoring device.

In a particular embodiment, the apparatus comprises an electrical circuit breaker and a sensor supplying a signal representative of the state of said circuit breaker to the monitoring device.

In a particular embodiment, the apparatus comprises a device for detection of the presence of electrical voltage supplying a signal representative of a voltage presence to the monitoring device.

According to a development of an embodiment of the invention, the monitoring device comprises an input circuit connected to the electromagnetic receiving means and an encoding circuit connected to said input circuit.

Advantageously, the input circuit comprises means for supplying an electrical power supply when an electromagnetic radiation is received.

Advantageously, the input circuit comprises means for supplying a signal representative of a clock signal when an electromagnetic radiation is received.

Preferably, the input circuit comprises means for varying a load impedance of the electromagnetic receiving means, the load impedance variation enabling an electromagnetic radiation received by said receiving means to be modified and a signal to be sent to means for emitting said electromagnetic radiation.

Preferably, the encoding circuit comprises at least one input to receive a signal representative of a monitoring signal and at least one output to supply a signal representative of a command.

Advantageously, the monitoring device comprises identification means to supply the encoding circuit with a monitoring signal representative of identification or setting parameters of the electrical apparatus.

Advantageously, the identification means comprise storage means to store a unique identification number for each apparatus.

Advantageously, the monitoring device comprises means for determining the state of at least one sensor of the electrical apparatus to supply the encoding circuit with a monitoring signal representative of the state of said at least one sensor.

Advantageously, the monitoring device comprises means for measuring at least one electrical quantity to supply the encoding circuit with a monitoring signal representative of said at least one electrical quantity.

Advantageously, the monitoring device comprises means for measuring at least one magnetic quantity to supply the encoding circuit with a monitoring signal representative of said at least one magnetic quantity.

Advantageously, the monitoring device comprises means for measuring at least one thermal quantity to supply the encoding circuit with a monitoring signal representative of said at least one thermal quantity.

Advantageously, the monitoring device comprises display means receiving a signal representative of a display command from the encoding circuit.

Advantageously, the monitoring device comprises actuating means receiving a signal representative of a command of the electrical apparatus from the encoding circuit.

Advantageously, the monitoring device comprises communication means to send signals to or receive signals from the encoding circuit.

Advantageously, the monitoring device comprises electromagnetic emitting means arranged in the apparatus to send signals from the encoding circuit.

Preferably, the encoding circuit comprises anticollision processing means to manage emission and/or receipt of communication frames.

Advantageously, the encoding circuit comprises means for transmitting a preset number of identical communication frames.

Preferably, the monitoring device comprises initialization means connected to the input circuit and to the encoding circuit.

The apparatus is preferably housed in a modular electrical switchgear case.

An electrical switchgear support in the form of a rail according to the invention comprises electromagnetic emitting means designed to emit an electromagnetic radiation to at least one electrical apparatus as defined above comprising electromagnetic receiving means.

Preferably, the electromagnetic emitting means comprise at least one induction loop arranged on a front face of said support.

Advantageously, the electromagnetic emitting means comprise at least one induction coil with several turns arranged on a front face of the support.

Preferably, the support comprises a body made of magnetic material to concentrate magnetic field lines.

In a preferred embodiment, the rail is a symmetric rail having a hollow part on the front face comprising at least one electromagnetic induction coil.

According to a first alternative embodiment, the electromagnetic induction coil has a central part without magnetic material.

According to a second alternative embodiment, the electromagnetic induction coil has a central part with a core made of magnetic material.

A monitoring device of an electrical apparatus according to the invention comprises electromagnetic emitting means designed to emit an electromagnetic radiation to at least one electrical apparatus as defined above comprising electromagnetic receiving means.

In a preferred embodiment, the device comprises means for generating a high frequency signal connected to the electromagnetic emitting means.

In a particular embodiment, the device comprises a processing circuit comprising means for modulating, demodulating, encoding and/or decoding a signal representative of an electromagnetic radiation able to be emitted by the electromagnetic emitting means.

Advantageously, the processing circuit comprises means for detecting the variation of the electromagnetic radiation emitted by the electromagnetic emitting means and able to be modified by a monitoring device of at least one apparatus.

Preferably, the device comprises display means connected to the processing circuit.

Advantageously, the device comprises means for communicating with a remote centralizer.

Advantageously, the device comprises a centralizer connected to the processing circuit.

Advantageously, the centralizer comprises electrical installation monitoring means designed to receive at least one identification number from at least one apparatus to monitor display of characteristics of said at least one apparatus.

Preferably, the device comprises an enclosure having at least one side wall comprising the electromagnetic emitting means.

Preferably, the electromagnetic emitting means comprise at least two electromagnetic induction coils on two walls arranged on opposite sides of an enclosure with respect to the arrangement of at least one electrical apparatus designed to be fitted in said enclosure.

In a particular embodiment, the electromagnetic emitting means comprise at least two serially connected electromagnetic induction coils connected to the means for generating a high frequency signal.

In another particular embodiment, the electromagnetic emitting means comprise at least two electromagnetic induction coils individually connected to means for generating a high frequency signal.

In a preferred embodiment, the device comprises at least one support in the form of a rail as defined above comprising electromagnetic emitting means.

In a preferred embodiment, the device comprises at least one electrical apparatus as defined above comprising electromagnetic receiving means.

An electrical installation according to the invention, comprising electrical apparatuses connected to an electrical power system, comprises at least one electrical apparatus as defined above comprising electromagnetic receiving means.

An electrical installation according to the invention, comprising electrical apparatuses connected to an electrical power system, comprises at least one support comprising emitting means as defined above to support at least one electrical apparatus.

An electrical installation according to the invention, comprising electrical apparatuses connected to an electrical power system, comprises at least one monitoring device as defined above to monitor at least one electrical apparatus comprising electromagnetic receiving means.

BRIEF DESCRIPTION OF THE DRAWINGS

Other advantages and features will become more clearly apparent from the following description of particular embodiments of the invention, given as non-restrictive examples only and represented in the accompanying drawings in which.

DETAILED DESCRIPTION OF DIFFERENT EMBODIMENTS OF THE INVENTION

Figure 1:
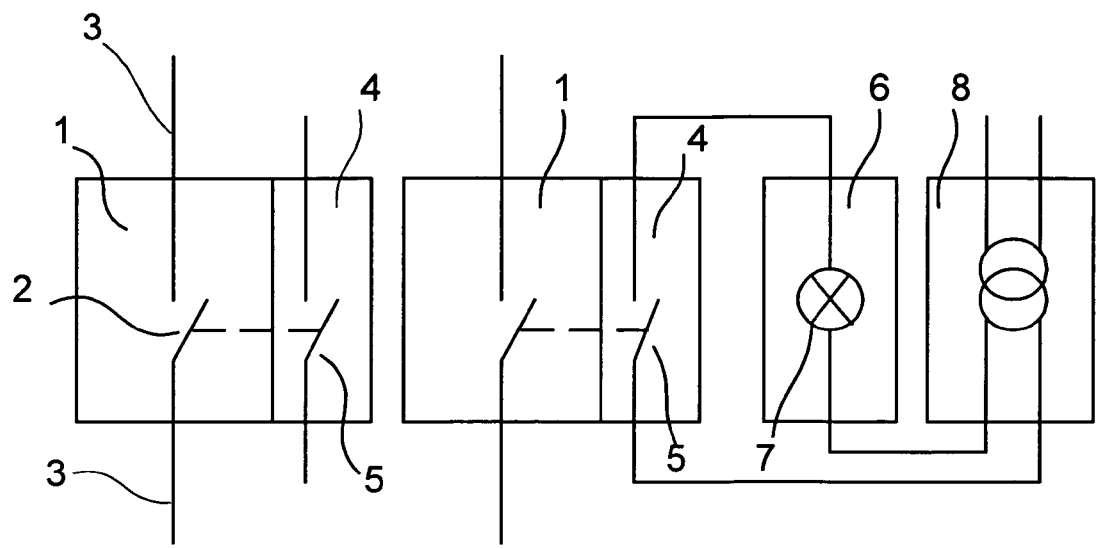
FIG. 1 represents a drawing of prior art electrical apparatuses and installation.

The drawing of FIG. 1 shows a first electrical apparatus 1 comprising a switch 2 connected to main electrical conductors 3. An auxiliary circuit 4 associated to the apparatus 1 comprises an electrical contact 5 mechanically coupled to the contact 2 to supply a signal representative of the state of the switch of the apparatus. The auxiliary circuit 4 can thus be considered as being a monitoring device of the apparatus 1. In this same figure, a second apparatus 1 having an auxiliary circuit 5 associated thereto is connected to a monitoring device comprising a modular unit 6 equipped with an indicator lamp 7 and an electrical power supply 8. The contact 5 of the auxiliary circuit, the indicator lamp 7 and outputs of the power supply 8 are serially connected to display the state of the electrical apparatus on the indicator lamp 7. In this case, the state of the electrical apparatus corresponds to the open or closed state of the switch 2.

A state-of-the-art installation comprising several apparatuses with auxiliary circuits requires a large amount of wiring and a great deal of space.

In an apparatus according to an embodiment of the invention a monitoring device comprises electromagnetic receiving means connected to at least one sensor. The electromagnetic receiving means are designed in particular to receive an electromagnetic radiation from electromagnetic emitting means to receive electrical power and/or to receive or send a signal representative of the state of at least one element of the apparatus detected by the sensor.

Figure 2:
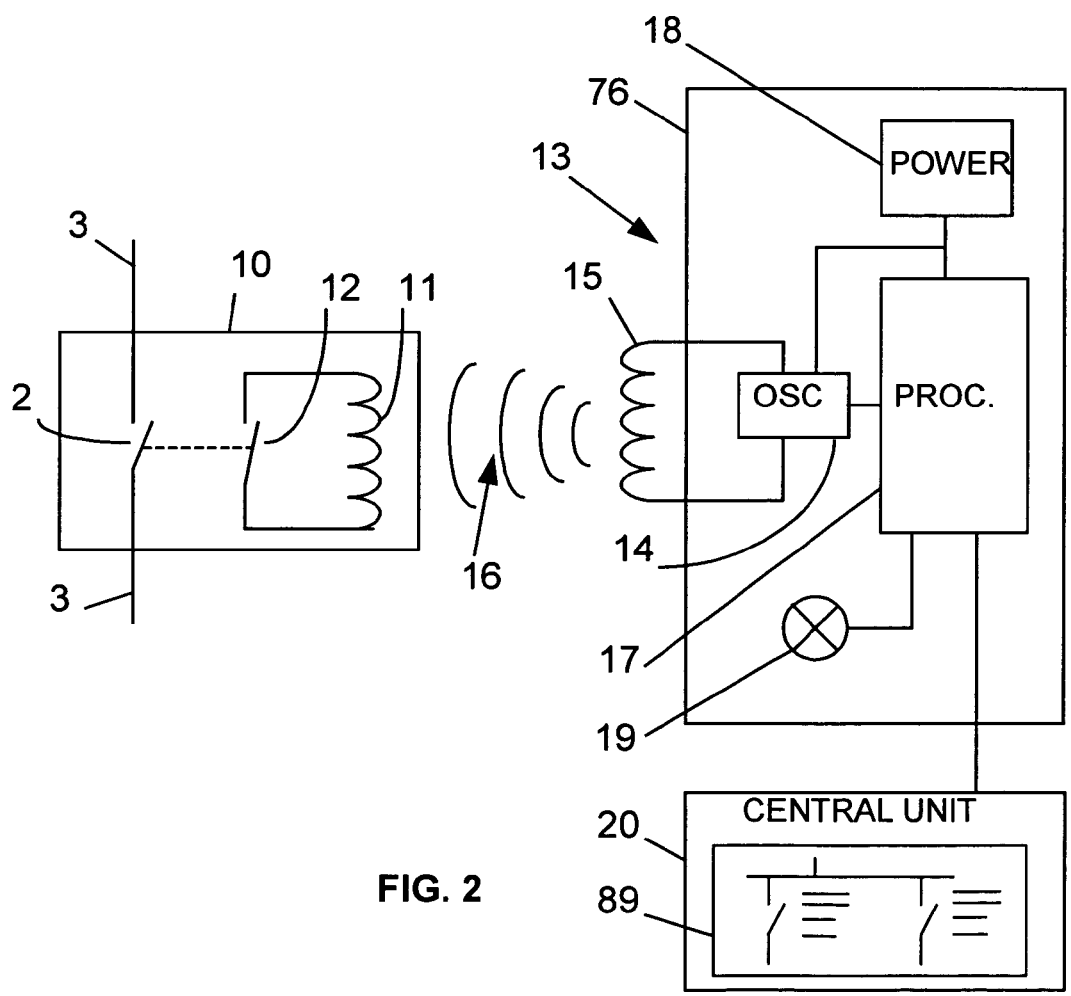
FIG. 2 represents a drawing of an electrical apparatus, a monitoring device and an installation according to a first embodiment of the invention.

In FIG. 2, an electrical apparatus 10 according to one embodiment of the invention comprises an electromagnetic receiver coil 11 connected to a sensor 12. The sensor 12 represented by a contact detects the position of the switch 1 and closes the circuit of the coil 11 when the switch 2 is closed. By closing the circuit, the sensor modifies the electromagnetic radiation received by the coil 11 to send a monitoring signal when said electromagnetic radiation is received. The monitoring device then operates as a transponder.

A monitoring device 13 comprises an oscillator circuit 14 connected to an electromagnetic emission coil 15. The oscillator circuit 14 supplies a high frequency signal to the coil 15 to generate the electromagnetic radiation 16 and enables variations of said electromagnetic radiation absorbed by at least one receiver coil 11 to be detected. The electromagnetic radiation 16 is designed to be emitted by the coil 15 to at least one apparatus 10 comprising a coil 11. In FIG. 2, the monitoring device 13 comprises a processing circuit 17 connected to the oscillator 14 to command emission of the electromagnetic radiation and to receive a return signal representative of the variations of the electromagnetic radiation emitted by the coil 15 and able to be modified by a monitoring device of at least one apparatus. The processing circuit can command emission of an electromagnetic radiation also performing encoding, decoding, modulation and/or demodulation of a signal representative of the electromagnetic radiation.

The monitoring device 13 comprises a power supply circuit 18 to supply electrical power to the oscillator 14 and processing circuit 17. In this embodiment, this processing circuit 17 commands a display device 19 represented by an indicator lamp. This circuit also comprises means for communicating with a remote centralizer 20 connected to the monitoring device.

The centralizer 20 preferably comprises electrical installation monitoring means 89 to indicate states and characteristics of the apparatuses and/or perform dynamic management of electrical installation schemes.

The oscillator 14 and processing circuit 17 can be integrated on a single circuit to form a single processing unit 76.

Depending on the distance between the coils 11 and 15, the electromagnetic receiver coil 11 can take the form of an inductance coil for close magnetic fields or the form of a looped electromagnetic antenna for distant magnetic fields.

Figure 3:
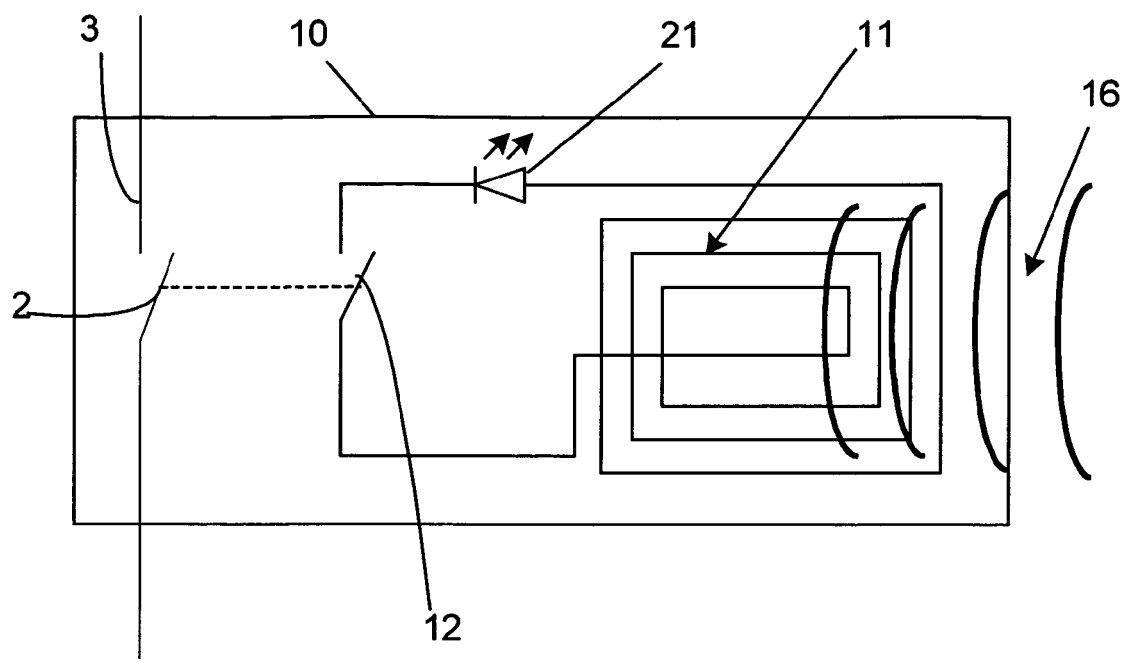
FIG. 3 represents a drawing of an electrical apparatus according to a second embodiment of the invention.

In the embodiment of FIG. 3, an apparatus 10 comprises a sensor 12 connected to the electromagnetic receiver coil 11, represented by an antenna, and an indicator lamp connected in series between the sensor and the coil 11. The indicator lamp can advantageously be a low-consumption light-emitting diode. In an apparatus of this kind, indication of the state of the apparatus is performed on the apparatus. The electromagnetic radiation captured by the coil 11 enables enough electrical power to be supplied to be able to supply the indicator lamp 21. In this case, the electromagnetic radiation enables the monitoring device of the apparatus to be supplied by remote power supply and the state of the apparatus to be transmitted to a monitoring device. It is also possible to use one of these functions only, electrical power supply of the monitoring device of the apparatus with indication on the apparatus or remote indication of the state of the apparatus only. Advantageously power supply by electromagnetic radiation enables auxiliary power supplies on apparatuses and all the problems linked to these auxiliary circuits to be avoided, in particular connection terminal, electrical isolation and space problems. Electromagnetic radiation emission coils connected to an oscillator circuit supplied by a power supply circuit are sufficient to emit an electromagnetic radiation to supply one or more apparatuses by remote power supply. The electromagnetic radiation emission frequency is preferably higher than 100 kHz.

Figure 4:
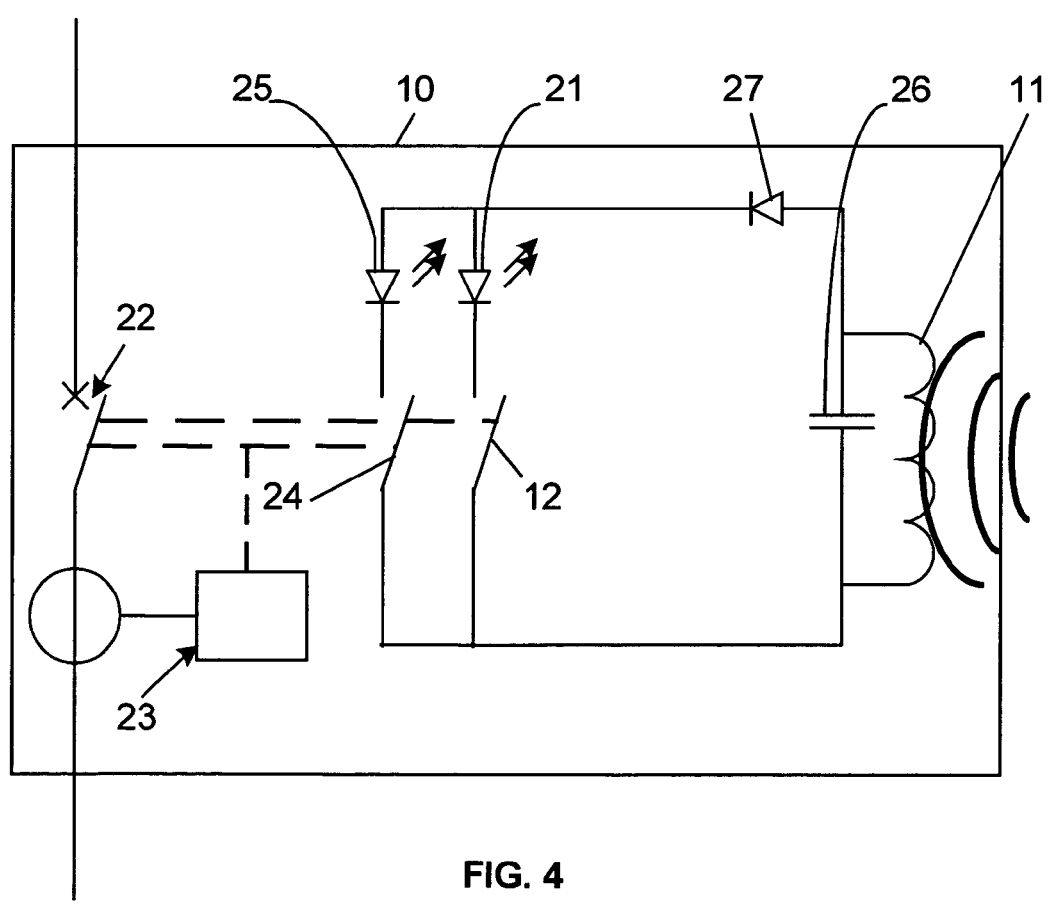
FIG. 4 represents a drawing of an electrical apparatus according to a third embodiment of the invention.

In FIG. 4, an apparatus 10 comprises a circuit breaker 22 opening whereof is commanded by a trip device 23. In this embodiment a sensor 12 detects the open or closed state of the circuit breaker and a sensor 24 detects the open state by tripping on an action of the trip device 23. The trip device can act in particular following a line or leakage current threshold overshoot. The sensor 12 commands lighting of the indicator lamp 21 representative of the open or closed state of the circuit breaker and the sensor 24 commands an indicator lamp 25 also arranged on the apparatus and representative of the open on a trip state.

Advantageously, the apparatus 10 of FIG. 4 comprises a capacitor 26 connected to the coil 11 to form a resonant circuit of resonance frequency appreciably equal to the frequency of an electromagnetic radiation to be captured. This circuit enables the electromagnetic radiation to be selected and its receipt to be improved. On output of the resonant electromagnetic radiation receiver circuit, a rectifier 27 represented by a diode is connected between the coil 11 and the indicator lamps 21 and 25 to supply a rectified voltage or current.

In this embodiment, the change of state of at least one sensor 12 or 24 enables at least one diode to be lit and the electromagnetic radiation to be varied to send a return signal back. The return signal can be used if necessary by a processing circuit of a monitoring device.

Figure 5:
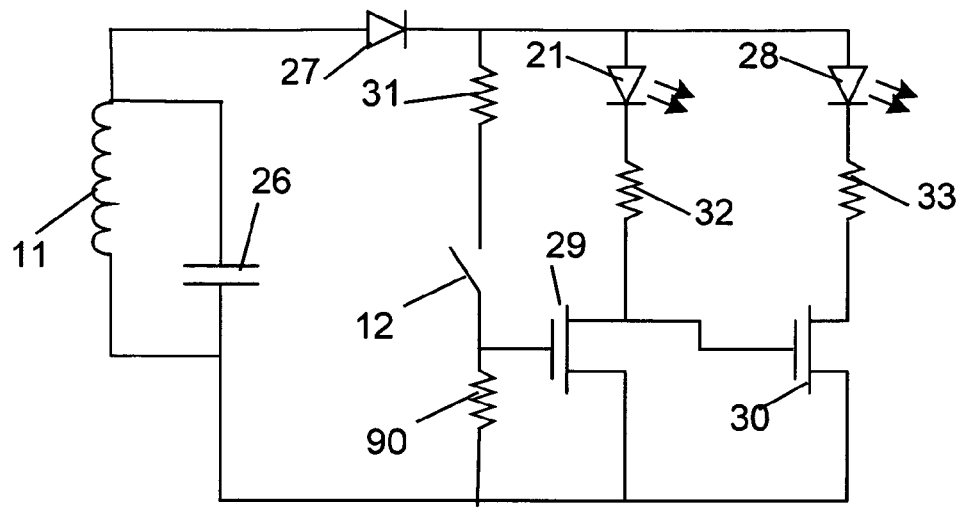
FIG. 5 represents a drawing of a monitoring device of an electrical apparatus according to a fourth embodiment of the invention.

In FIG. 5, an electrical apparatus monitoring device according to an embodiment of the invention comprises a resonant circuit comprising the electromagnetic radiation receiver coil 11 and a capacitor 26. A diode 27 rectifies a receipt signal representative of the electromagnetic radiation to supply a DC voltage or current to light-emitting diodes 21 and 28 commanded by transistors respectively 29 and 30. A sensor 12 commands turn-on of the first transistor 29 which reverses the signal to command the second transistor 30. Limiting and polarization resistors 31, 32 and 33 are preferably connected in series respectively with the sensor 12 and the diodes 21 and 28. A resistor 90 enables the transistor 29 to be polarized at rest.

Thus, when the sensor 12 is open, the transistor 29 is open and the input of the transistor 30 is polarized via the diode 21 and the resistor 32. The transistor 30 is then on and the diode 28 is lit. When the sensor 12 is closed, the transistor 29 is on and the diode 21 is lit, the on state of the transistor 29 blocks polarization of the transistor 30 which is no longer on, and the diode 28 is extinguished.

In this embodiment, one of the two diodes 21 or 28 is lit so long as the electromagnetic radiation supplies energy to the coil 11. The state of the sensor 12 or of the apparatus is detected if one of the diodes is lit, but if both the diodes 21 and 28 are extinguished this may mean that sufficient radiation is not emitted or that a problem has occurred. A device of this kind also enables correct operation of the power supply and monitoring of the apparatuses to be checked. The diodes 21 and 28 can be independent or grouped in a single component able to emit a light of different color depending on the control signal. For example, the diodes 21 and 28 can be replaced by a two-colored light-emitting diode.

To send a return signal back, the diodes 21 and 28 can have a different DC voltage, or the limiting resistors 32 and 33 can be of different values. If there is no use of a return signal, the diodes can be of the same type and the resistors of the same value.

Figure 6:
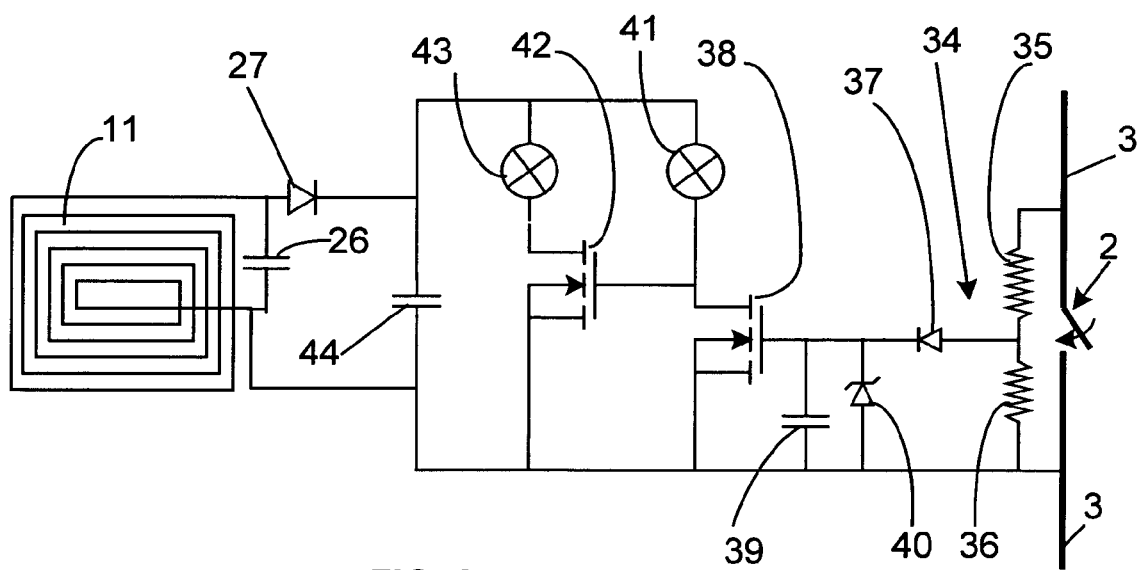
FIG. 6 represents a drawing of a monitoring device of an electrical apparatus according to a fifth embodiment of the invention.

In FIG. 6, the sensor is a voltage presence detector 34 connected between two poles of a contact 2 of the apparatus. This detector comprises a voltage divider comprising two resistors 35 and 36 connected in series, a mid-point of the divider connected to a rectifying diode 37 to command a transistor 38 which comprises a filtering capacitor 39 and a voltage clipper 40 on its control electrode. The transistor 38 commands a first indicator lamp 41 and reverses the control signal to command a second transistor 42 which commands a second indicator lamp 43. The indicator lamps 41 and 43 are thus commanded in reverse manner depending on whether voltage is present or not.

An induction coil 11 in the form of an antenna designed to receive an electromagnetic radiation is connected to a rectifying diode 27 to supply the monitoring device with rectified current. A capacitor 44 connected on output of the diode 27 filters the current rectified by the diode to supply a DC supply voltage to indicator lamps 41 and 43 and transistors 38 and 42.

Figure 7:
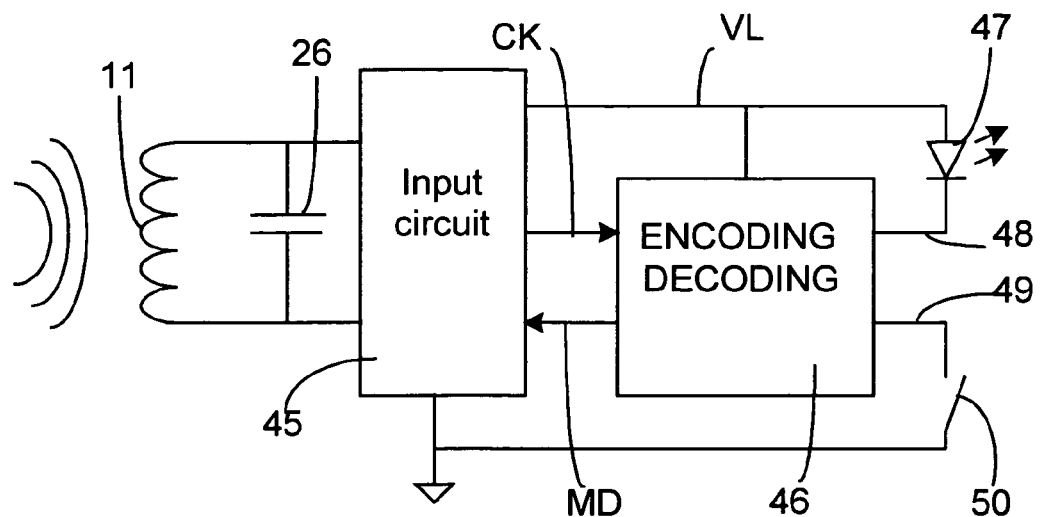
FIG. 7 represents a drawing of a monitoring device of an electrical apparatus according to a sixth embodiment of the invention.

In the embodiment of FIG. 7, the monitoring device comprises an input circuit 45 connected to the electromagnetic receiving means represented by the coil 11 and the capacitor 26 and an encoding circuit 46 connected to the input circuit. The input circuit supplies an electrical supply voltage VL to the encoding circuit 46 and/or to display means 47 when an electromagnetic radiation is received.

Advantageously, the input circuit supplies a signal CK representative of a clock signal to the encoding circuit when an electromagnetic radiation is received. In a particular embodiment the signal CK enables the encoding circuit to be commanded to synchronize modulation means of a return signal. The signal CK can also be used to perform demodulation of a signal carried by the electromagnetic radiation and intended for the monitoring device of the apparatus. The encoding circuit supplies a modulation signal MD to the input circuit to command a load variation and consequently to send a return signal according to functions defined in the encoding circuit. Modulation of the return signal can be a phase, amplitude or frequency modulation.

In the embodiment of FIG. 7, the encoding circuit comprises at least one output to supply a signal 48 representative of a control signal and one input to receive a signal 49 representative of a monitoring signal. In this case, the signal 48 is supplied to a light-emitting diode 47 and the signal 49 is supplied by a sensor 50.

Figure 8:
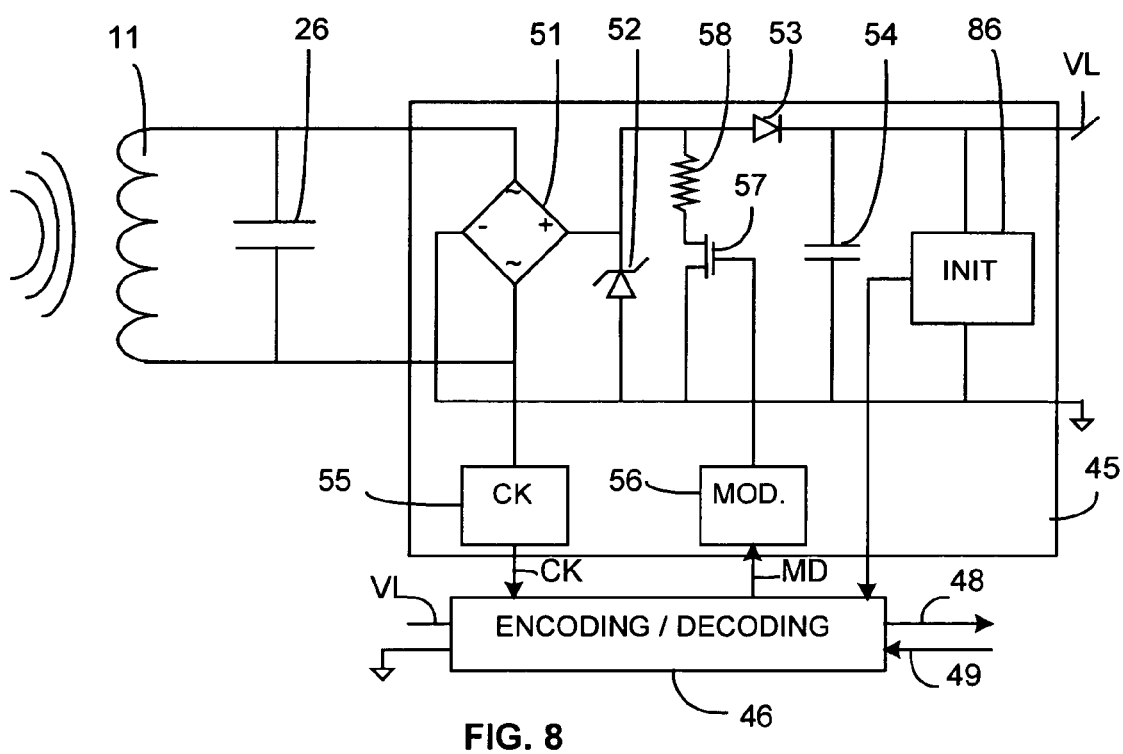
FIG. 8 represents a drawing of a monitoring device of an electrical apparatus according to a first development of the embodiment of FIG. 7.

In FIG. 8, the diagram of the input circuit is represented in detailed manner according to an embodiment of the invention. The input circuit comprises a rectifier bridge 51 connected to the resonant circuit represented by the electromagnetic induction coil 11 and the capacitor 26 to receive the electromagnetic radiation. A voltage limiter 52 is connected to outputs of the rectifier bridge to limit the supply voltage VL to a maximum value. An anti-reverse diode 53 is connected to a positive output of the bridge 51 to supply a filtering capacitor 54. A supply voltage VL is then supplied on output of the capacitor 54.

A clock signal detection circuit 55 is connected to an AC input of the bridge and to the encoding circuit to supply the signal CK. The signal CK can in particular serve the purpose of determining a modulation signal, in particular if phase modulation of the return signal is chosen. The modulation signal MD is supplied to a modulation circuit 56 to shape modulation signals and command means for varying a load impedance of the electromagnetic receiving means. In this embodiment, the means for varying a load impedance comprise a transistor 57 in series with a resistor 58 connected on output of the bridge 51 before the anti-reverse diode 53. When turn-on of the transistor 57 is commanded, the resistor 58 charges the output of the bridge and causes an impedance variation. This load impedance variation enables an electromagnetic radiation received by said receiving means 11 and 26 to be modified and sends a signal back to emitting means. The anti-reverse diode 53 prevents the capacitor from discharging and ensures continuity of the power supply.

The encoding circuit enables in particular sending of communication frames in the send-back or return signal to the communication means to be processed. However, when several apparatuses are liable to send send-back or return signals, the encoding circuit advantageously comprises anti-collision processing means to manage transmission and receipt of communication frames. For example, the encoding circuit can transmit a preset number of identical communication frames. Advantageously, at least five identical frames are sent.

The device of FIG. 8 also comprises an initialization circuit 86 to supply an initialization signal on an input of the encoding circuit 46. The initialization signal can be supplied, for example, at each rise of the supply voltage VL.

Figure 9:
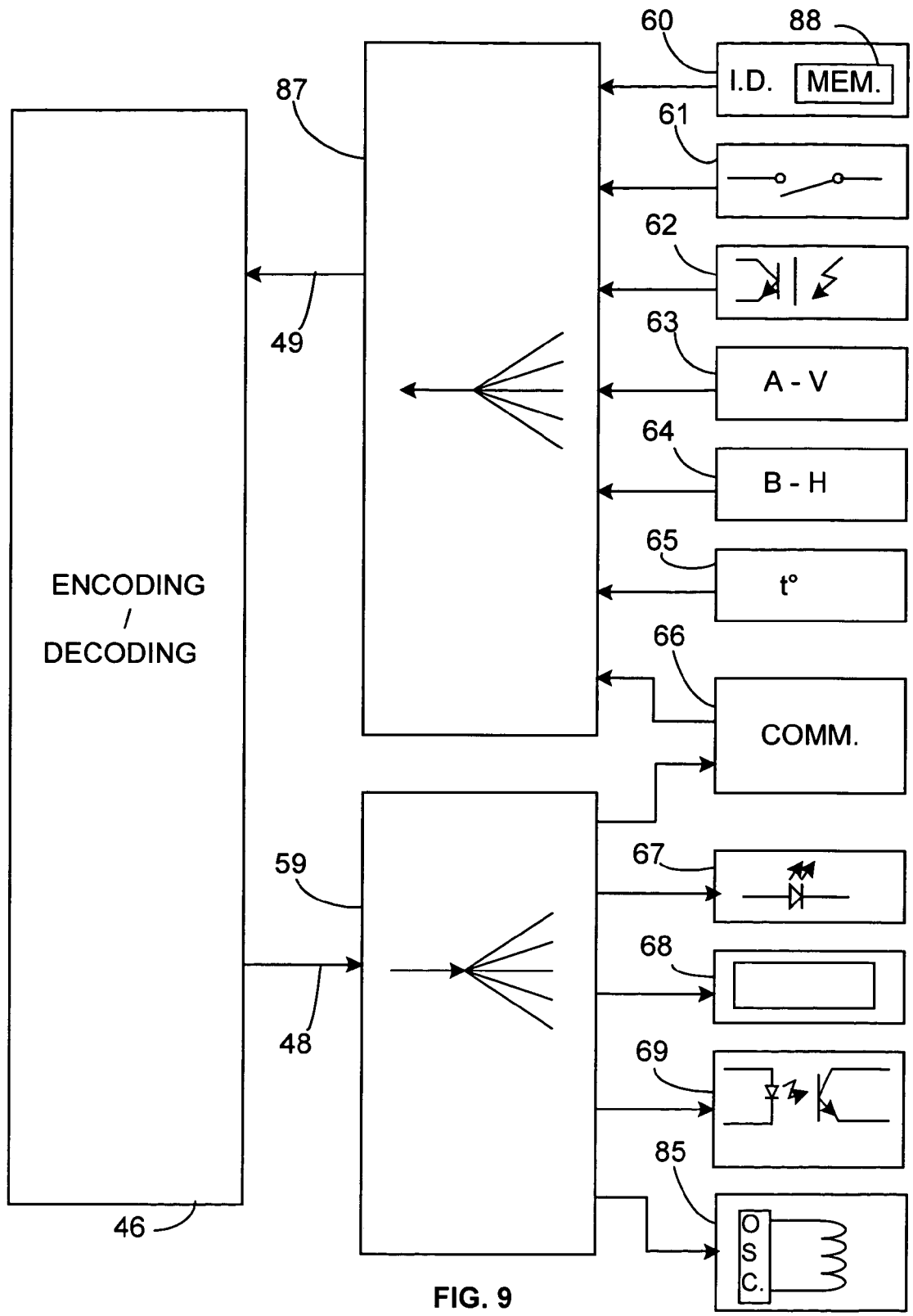
FIG. 9 represents a drawing of a second development of the embodiment s of FIGS. 7 and 8.

FIG. 9 represents an encoding circuit 46 with an input to receive the signal 49 and an output to supply the signal 48, these signals being representative of one or more monitoring or control signals. The signals can be supplied or received directly on the input or the output or as in FIG. 9. They can also pass via signal pooling circuits such as multiplexers, demultiplexers, signal shift or serialization registers, or serial communication bus links. An input pooling circuit 87 is connected to the encoding circuit 46 to pool input signals and an output pooling circuit 59 is connected to the encoding circuit 46 to dissociate output signals.

The encoding circuit input and output signals 48 and 49 can be binary logic signals, signals with several logic levels, and/or analog signals.

Thus in FIG. 9, an identification device 60 enables a monitoring signal representative of identification or setting parameters of the electrical apparatus to be supplied to the encoding circuit. The identification parameters can be representative of serial number, type of apparatus, rating, or size. The setting parameters can be representative of current or voltage thresholds, tripping delay or other parameters of an electrical apparatus.

The identification device can comprise a memory 88 to store a unique identification number for each apparatus. The unique identification number can comprise information of a label defining the type of apparatus with its characteristics and a serial number. The identification number can be used in a central unit 20 comprising electrical installation monitoring means 89. In a central unit of this kind, an array defined for a display interface comprises label support functions to convert the identification number into alphanumeric or graphic data. This data can be used with identification or setting parameters to perform dynamic management of electrical installation schemes. For example, if an apparatus is replaced by another apparatus with different characteristics, a diagram or array displayed on the central unit is automatically updated.

For example, other functions of the unique identification number stored in the memory 88 can be an addressing function of a communication circuit of the apparatus, or a function to identify the apparatus in an anti-copy device by unique serial number.

A device 61 for determining the state of at least one sensor of the electrical apparatus enables the encoding circuit to be supplied with a monitoring signal representative of the state of said at least one sensor. The sensor can in particular detect a contact open or closed state, or a state of a circuit breaker tripping mechanism. The sensor can in particular be an electrical contact, a position sensor, or an optic sensor reacting to a change made on a light beam for example blocking, reflection or deviation of said beam. A sensor of this kind is represented by a device 62.

Devices 61 and 62 can also determine the state of sensors representative of various causes of tripping of a circuit breaker, in particular a thermal or long delay trip, a magnetic or short delay trip, or a differential or earth protection trip.

A device 63 for measuring at least one electrical quantity enables a monitoring signal representative of said at least one electrical quantity to be supplied to the encoding circuit. The electrical quantity can be in particular an electrical phase, earth protection, or differential current, or an electrical voltage, and also a current or voltage threshold overshoot. The electrical quantity can be measured by means of measuring transformers, a voltage divider, Hall effect sensor, or a magneto-resistor.

A device 64 for measuring at least one magnetic quantity enables a monitoring signal representative of said at least one magnetic quantity to be supplied to the encoding circuit. The magnetic quantity can be an electromagnetic field or induction.

A device 65 for measuring at least one thermal quantity enables a monitoring signal representative of said at least one thermal quantity to be supplied to the encoding circuit. This quantity can be in particular a temperature internal to a case of the electrical apparatus, a contact temperature, or ambient temperature external to said case.

On receiving such signals, a remote centralizer can display part or all of the characteristics of an apparatus, for example on a computer monitor.

A communication device 66 enables signals to be sent to or received from the encoding circuit. The communication circuit also enables communication in particular with other circuits of the electrical apparatus. The unique identification number can be used for addressing the communication device.

A display device 67 enables a signal representative of a display command to be received from the encoding circuit. This device can be in particular one or more indicator lamps in the form of light-emitting diodes, or a device 68 such as a low-consumption liquid crystal display.

An actuating device 69 enables a signal representative of a command of the electrical apparatus to be received from the encoding circuit. A device of this kind can enable remote opening or testing of an electrical apparatus to be commanded. It can be achieved in the form of a relay, a transistor or for example an optic coupler.

An electromagnetic emitting device 85 housed in the apparatus enables signals to be sent from the encoding circuit. Preferably, the emitting frequency of the device 85 is different from the frequency of the electromagnetic radiation designed to be received by the electromagnetic receiving means 10.

The devices 60 to 69 and 85 can preferably be supplied by the power supply VL supplied by the input circuit which is remote supplied. However, in other embodiments of the invention, certain devices can also be supplied by other power supplies of the electrical apparatus 10, electrical isolation being performed by the electromagnetic radiation receiver and emission coils 11 and 15.

Figure 10:
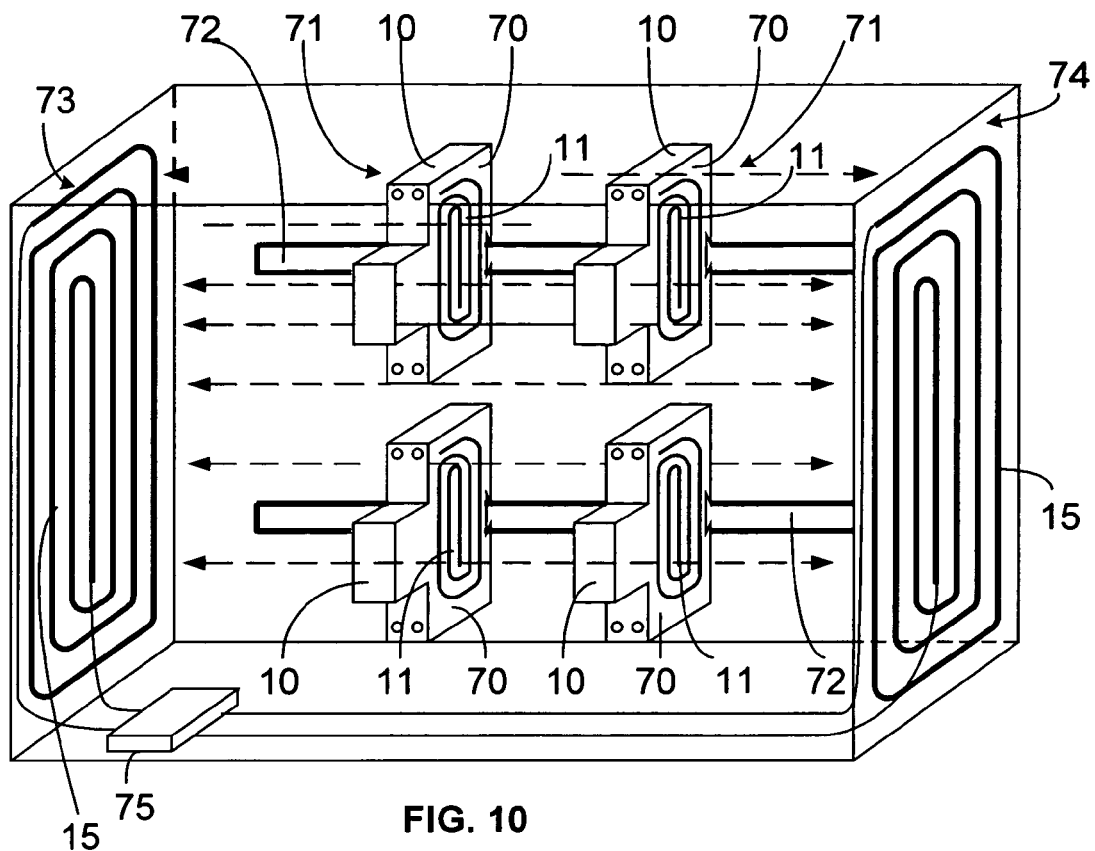
FIG. 10 represents a view of a monitoring device and of an electrical installation according to a first alternative version of an embodiment of the invention.

FIG. 10 shows a view of an electrical switchboard, of a part of an installation, of apparatuses 10, and of a monitoring device according to embodiments of the invention. In this figure, the apparatuses 10 have an electromagnetic radiation receiver coil 11 arranged on a side wall 70 of said apparatus. The coil 11 is preferably of flat shape. The electrical apparatuses 10 are preferably housed in a modular electrical switchgear case 71 able to be fitted on a support 72 in the form of a rail.

The monitoring device advantageously comprises the electromagnetic emitting means arranged in at least one wall of an electrical cabinet. Thus, in FIG. 10, electromagnetic radiation emission coils 15 of a monitoring device are arranged on two opposite side walls 73 and 74 with respect to the arrangement of at least one electrical apparatus 10. The emission coils 15 are connected to a case 75 comprising in particular an oscillator 14, a processing circuit 17, and/or a power supply 18. The case 75 can also be a modular electrical switchgear case able to be fitted on a support in the form of a rail 72. The coils 15 can be connected independently on the case 75 or connected in series before being connected on said case 75. In this embodiment, the electromagnetic radiation 16 has appreciably linear field lines perpendicular to a plane of the coils 11 of flat shapes.

Figure 11:
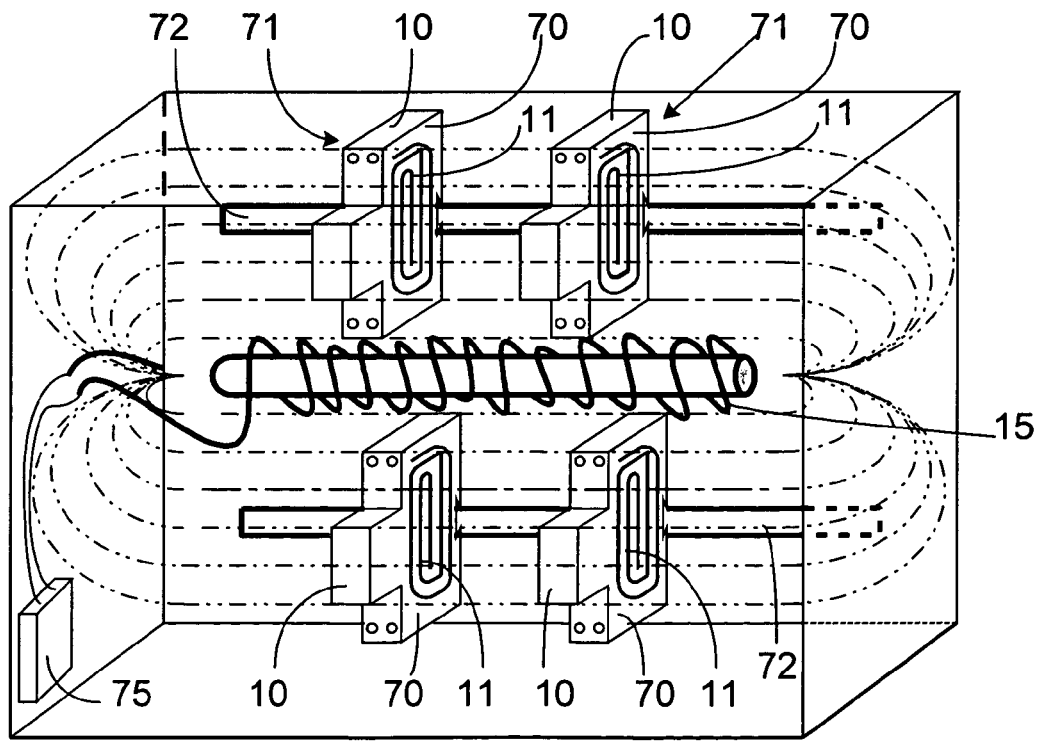
FIG. 11 represents a view of a monitoring device and of an electrical installation according to a second alternative version of an embodiment of the invention.

FIG. 11 shows a view of an electrical switchboard, of a part of an installation, of apparatuses 10, and of a monitoring device according to an alternative version of the embodiments of FIG. 11. In this case the electromagnetic radiation emission coil 15 is of elongate shape arranged parallel to at least one support in the form of a rail 72 designed to receive at least one electrical apparatus comprising an electromagnetic receiver coil 11. In this figure, the coil 15 is arranged between two rails 72.

Figure 12:
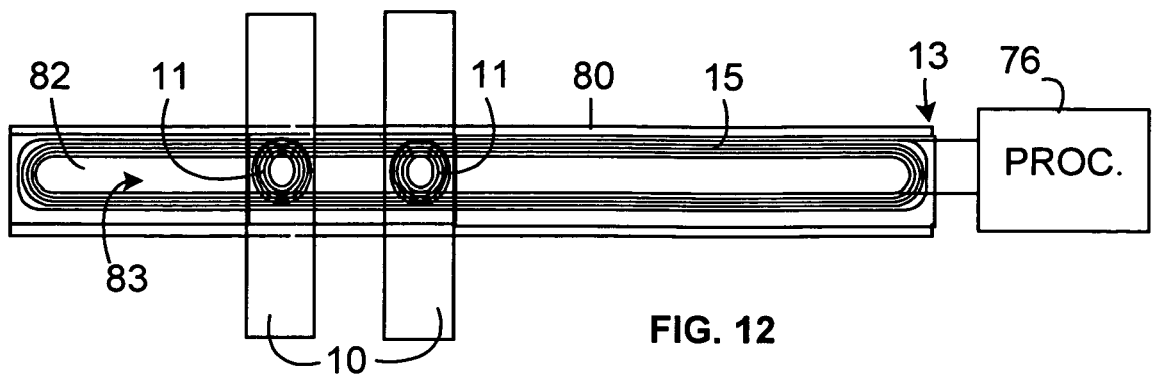
FIG. 12 represents a view of electrical apparatuses, a support, a monitoring device and an electrical installation according to a third alternative version of an embodiment of the invention.
Figure 13:
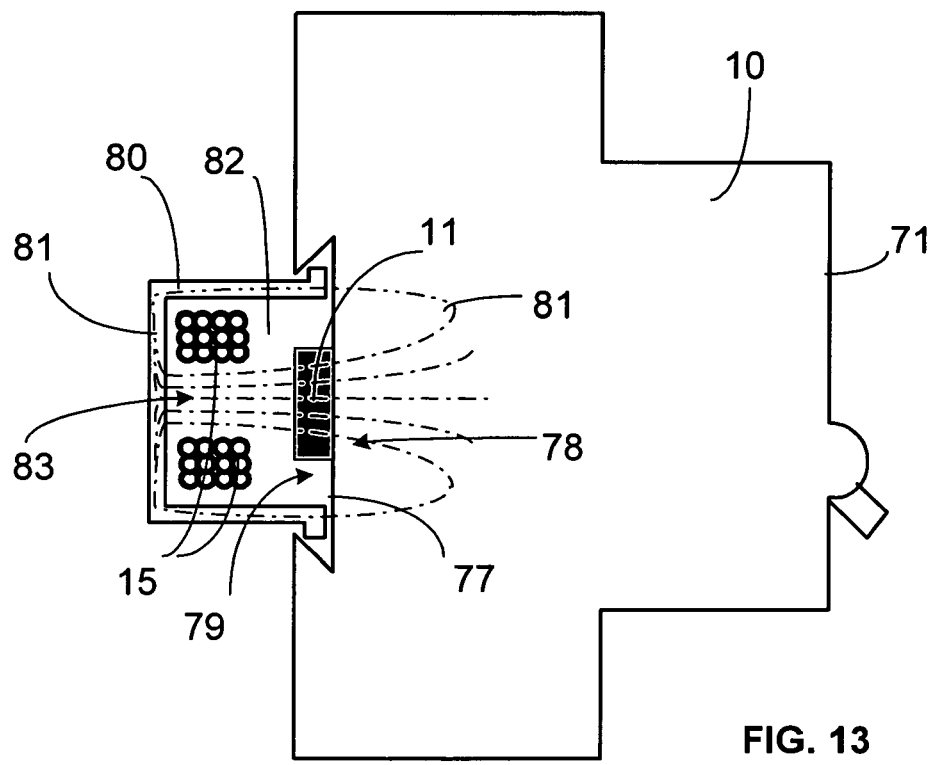
FIG. 13 represents a side view of an apparatus, and of a support according to the embodiment of FIG. 12.

FIGS. 12 and 13 show another embodiment of the invention. In this embodiment, an apparatus 10 comprises an electromagnetic radiation receiver coil 11 arranged on a back-plate 77 of said apparatus. The coil 11 can be fixed onto the back-plate 77 on the inside 78 or the outside 79 of the apparatus as represented in FIG. 13. In this case, the coil is able to be directed towards a support comprising electromagnetic radiation emitting means 15. The electrical apparatus 10 is then preferably housed in a case 71 for housing modular electrical switchgear able to be fitted on a support in the form of a rail.

In the embodiments of FIGS. 12 and 13, a support 80 comprises electromagnetic emitting means designed to emit an electromagnetic radiation to at least one electrical apparatus 10. Advantageously, the support 80 comprises an induction loop or an induction coil with several turns arranged on a front face of said support. The body of the support is preferably made of magnetic material to concentrate field lines.

Preferably, the support 80 has the form of a rail to support electrical apparatuses. Advantageously, the support is a symmetric rail having a hollow part 82 on the front face comprising the electromagnetic induction coil 15. A central part 83 of the electromagnetic induction coil 15 can be with or without magnetic material.

Preferably, a magnetic field axis is perpendicular to the length of the support in the form of a rail 80. However, in another embodiment, it is possible to arrange a coil having a magnetic field axis parallel to the length of the support in the form of a rail 80.

Figure 14:
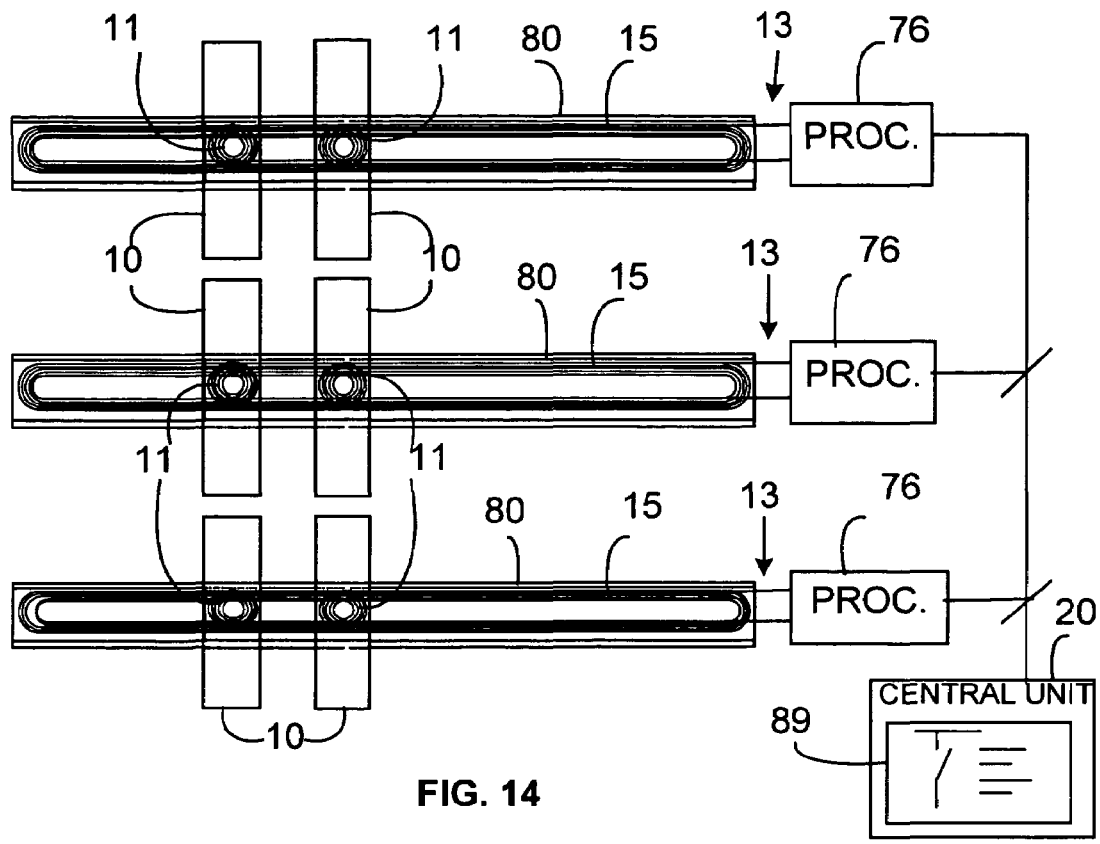
FIGS. 14 and 15 represent views of alternative embodiments of the monitoring devices and of installations comprising apparatuses and supports according to the embodiments of FIGS. 12 and 13.
Figure 15:
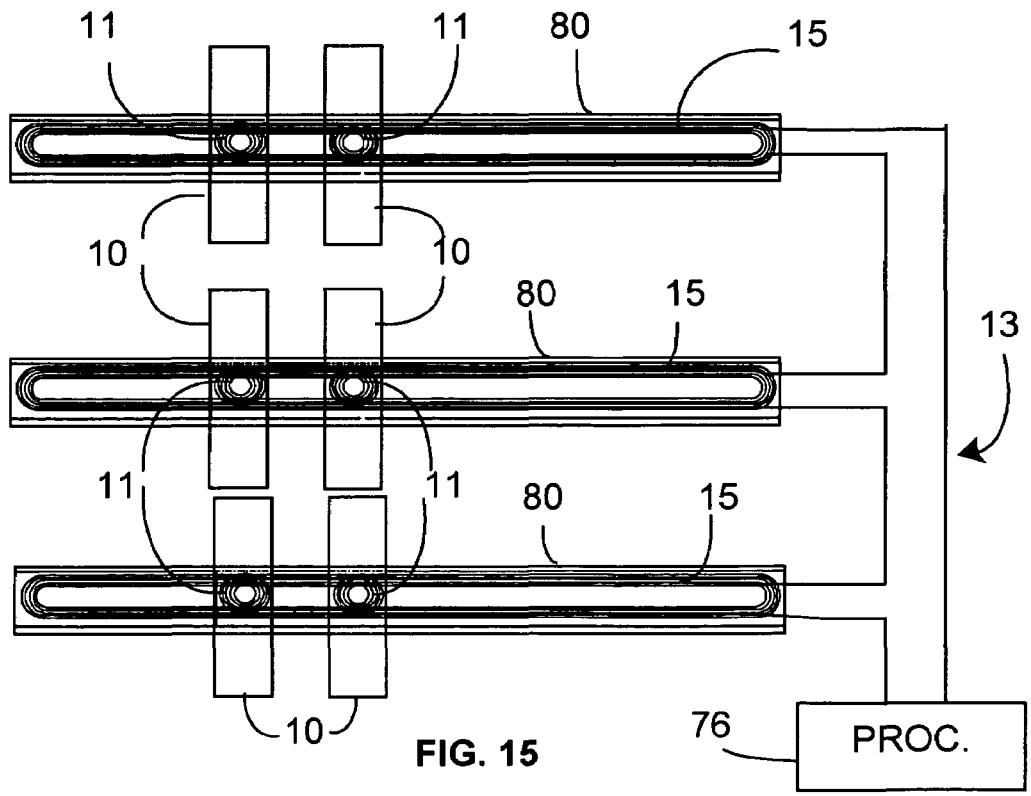

FIGS. 14 and 15 show monitoring devices and parts of installations comprising apparatuses and supports according to the embodiments of FIGS. 12 and 13. In FIG. 14, the electrical installation comprises three monitoring devices 13 comprising a support 80 in the form of a rail containing a coil 15, and apparatuses 10 with a coil 11 arranged on the back-plate facing the coil 15. Each coil 15 is individually connected to a processing unit 76 comprising an oscillator and a processing circuit. The processing units 76 of each monitoring device are connected to a centralizer 20, also called central unit or control center. The centralizer 20 can be located near the monitoring devices, for example in the same electrical switchboard or cabinet. It can also be located remotely to receive signals from other monitoring devices of the electrical installation.

In FIG. 15, the electrical installation comprises a monitoring device 13 comprising three supports 80 in the form of rails containing coils 15 and apparatuses 10 with a coil 11 arranged on the back-plate facing the coils 15. The coils 15 of the three supports 80 are connected in series to a processing unit 76 comprising an oscillator and a processing circuit.

The electrical installations according to embodiments of the invention relate both to apparatuses connected to an electrical power distribution system or devices connected for example to centralizers and to electrical cabinets, switchboards or enclosures housing said apparatuses, supports or monitoring devices described above.

The apparatus can in particular be a switch, a circuit breaker, a relay, a contactor, a remote-controlled switch, a time switch, an indication or display module, or a communication module connected for example to an industrial or home automation system bus. A monitoring device can be housed in a modular electrical switchgear module.

What is claimed is:

1. An electrical apparatus comprising electrical components, wherein at least one of said electrical components is a monitoring device,
    said monitoring device comprising electromagnetic radiation receiving means connected to at least one sensor, said electromagnetic radiation receiving means for receiving electromagnetic radiation from electromagnetic emitting means, wherein:
    the electromagnetic radiation receiving means are located on a side of the electrical apparatus and are for being directed towards a support comprising means for emitting an electromagnetic radiation to at least one electrical apparatus wherein said support further comprises an electrical switch gear rail comprising at least one induction loop located on a front face of said support; and
    the electromagnetic radiation receiving means is for supplying electrical power to electrical components upon receipt of electromagnetic radiation from such means for emitting electromagnetic radiation located on such support.

2. The electrical apparatus according to claim 1, wherein the monitoring device comprises load variation means connected to the electromagnetic radiation receiving means to send a monitoring signal by modifying electromagnetic radiation received by the electromagnetic radiation receiving means.

3. The electrical apparatus according to claim 1, wherein the electromagnetic radiation receiving means comprise at least one electromagnetic induction coil.

4. The electrical apparatus according to claim 1, wherein the electromagnetic radiation receiving means comprise at least one antenna.

5. The electrical apparatus according to claim 1, wherein the electromagnetic radiation receiving means comprise a circuit tuned to a frequency substantially equal to a frequency of the electromagnetic radiation.

6. The electrical apparatus according to claim 1, wherein said electrical apparatus comprises a side wall, and the electromagnetic receiving means are arranged in at least one side wall of the electrical apparatus.

7. The electrical apparatus according to claim 1, comprising an electrical switch and a sensor for supplying a signal representative of the state of said switch to the monitoring device.

8. The electrical apparatus according to claim 1, comprising an electrical circuit breaker and a sensor for supplying a signal representative of the state of said circuit breaker to the monitoring device.

9. The electrical apparatus according to claim 1, comprising a voltage detection device for supplying a signal representative of a voltage in a circuit to the monitoring device.

10. The electrical apparatus according to claim 1, wherein the apparatus is located in a modular electrical switchgear case.

11. The electrical apparatus according to claim 1, wherein the electromagnetic emitting means comprise at least one induction coil with a plurality of turns located on a front face of the support.

12. The electrical apparatus according to claim 1, comprising a body made of magnetic material to concentrate magnetic field lines.

13. An electrical installation comprising a plurality of second electrical apparatuses connected to an electrical power system and at least one first electrical apparatus according to claim 1.

14. An electrical installation comprising a plurality of second electrical apparatuses connected to an electrical power system and at least one support comprising electromagnetic radiation receiving means to support at least one first electrical apparatus according to claim 1.

15. The electrical apparatus according to claim 1, wherein the rail has a front face and is a symmetrical rail having a hollow part on the front face comprising at least one electromagnetic induction coil.

16. The electrical apparatus according to claim 15, wherein the electromagnetic induction coil has a central part without magnetic material.

17. The electrical apparatus according to claim 15, wherein the electromagnetic induction coil has a central part comprising a core made of magnetic material.

18. An electrical switchgear monitoring device comprising electromagnetic emitting means for emitting electromagnetic radiation to be received by at least one electrical apparatus according to claim 1.

19. The device according to claim 18, comprising an enclosure having at least one side wall comprising the electromagnetic emitting means.

20. The device according to claim 18, wherein the electromagnetic emitting means comprise at least two electromagnetic induction coils located on two walls, said walls on opposite sides of an enclosure having therein at least one electrical apparatus.

21. The device according to claim 18, wherein the electromagnetic emitting means comprise at least one electromagnetic induction coil of elongate shape located parallel to at least one support rail for receiving an electrical apparatus comprising electromagnetic receiving means.

22. The device according to claim 18, wherein the electromagnetic emitting means comprise at least two serially connected electromagnetic induction coils connected to a means for generating a high frequency signal.

23. The device according to claim 18, wherein the electromagnetic emitting means comprise at least two electromagnetic induction coils each directly connected to a means for generating a high frequency signal.

24. The device according to claim 18, comprising at least one support in the form of a rail.

25. An electrical installation comprising a plurality of second electrical apparatuses connected to an electrical power system and at least one monitoring device according to claim 18 to monitor at least one first electrical apparatus comprising electromagnetic radiation receiving means.

26. The device according to claim 18, comprising means for generating a high frequency signal connected to the electromagnetic emitting means.

27. The device according to claim 18, comprising a processing circuit comprising means for modulating, demodulating, encoding and/or decoding a signal representative of electromagnetic radiation emitted by the electromagnetic emitting means.

28. The device according to claim 27, wherein the processing circuit comprises means for detecting a variation of the electromagnetic radiation emitted by the electromagnetic emitting means and for being modified by a monitoring device of at least one apparatus.

29. The device according to claim 27, comprising display means connected to the processing circuit.

30. The device according to claim 27, comprising means for communicating with a remote centralizer.

31. The device according to claim 27, comprising a centralizer connected to the processing circuit.

32. The device according to claim 31, wherein the centralizer comprises electrical installation monitoring means for receiving at least one identification number of at least one apparatus to monitor display of characteristics of said at least one apparatus.

33. The electrical apparatus according to claim 1, wherein the monitoring device comprises an input circuit connected to the electromagnetic radiation receiving means and an encoding circuit connected to said input circuit.

34. The electrical apparatus according to claim 33, wherein the input circuit comprises means for supplying electrical power when electromagnetic radiation is received.

35. The electrical apparatus according to claim 33, wherein the input circuit comprises means for supplying a signal representative of a clock signal when electromagnetic radiation is received.

36. The electrical apparatus according to claim 33, wherein the input circuit comprises means for varying a load impedance of the electromagnetic receiving means, the load impedance variation enabling electromagnetic radiation received by said receiving means to be modified and a signal to be sent back to a means for emitting such received electro-magnetic radiation.

37. The electrical apparatus according to claim 33, wherein the encoding circuit comprises at least one input for receiving a signal representative of a monitoring signal and at least one output for supplying a signal representative of a command.

38. The electrical apparatus according to claim 33, wherein the monitoring device comprises means for determining the state of at least one sensor of the electrical apparatus to supply a monitoring signal representative of the state of said at least one sensor to the encoding circuit.

39. The electrical apparatus according to claim 33, wherein the monitoring device comprises means for measuring at least one electrical quantity to supply a monitoring signal representative of said at least one electrical quantity to the encoding circuit.

40. The electrical apparatus according to claim 33, wherein the monitoring device comprises means for measuring at least one magnetic quantity to supply a monitoring signal representative of said at least one magnetic quantity to the encoding circuit.

41. The electrical apparatus according to claim 33, wherein the monitoring device comprises means for measuring at least one thermal quantity to supply a monitoring signal representative of said at least one thermal quantity to the encoding circuit.

42. The electrical apparatus according to claim 33, wherein the monitoring device comprises actuating means for receiving a signal representative of a command of the electrical apparatus from the encoding circuit.

43. The electrical apparatus according to claim 33, wherein the monitoring device comprises communication means for sending signals to or receiving signals from the encoding circuit.

44. The electrical apparatus according to claim 33, wherein the monitoring device comprises electromagnetic radiation emitting means located in the electrical apparatus to send signals from the encoding circuit.

45. The electrical apparatus according to claim 33, wherein the encoding circuit comprises anticollision processing means for managing emission and/or receipt of communication frames.

46. The electrical apparatus according to claim 33, wherein the encoding circuit comprises means for transmitting a preset number of identical communication frames.

47. The electrical apparatus according to claim 33, wherein the monitoring device comprises initialization means connected to the input circuit and to the encoding circuit.

48. The electrical apparatus according to claim 33, wherein the monitoring device comprises identification means for supplying a monitoring signal representative of identification or setting parameters of the electrical apparatus to the encoding circuit.

49. The electrical apparatus according to claim 48, wherein the identification means comprise storage means for storing a unique identification number for each electrical apparatus.

50. An electrical apparatus comprising electrical components, wherein at least one of said electrical components is a monitoring device,
    said monitoring device comprising electromagnetic radiation receiving means connected to at least one sensor, said electromagnetic radiation receiving means for receiving electromagnetic radiation from electromagnetic emitting means, wherein:
        the electromagnetic radiation receiving means are located on a side of the electrical apparatus and are for being directed towards a support comprising means for emitting an electromagnetic radiation; and
        the electromagnetic radiation receiving means is for supplying electrical power to electrical components upon receipt of electromagnetic radiation from such means for emitting electromagnetic radiation located on such support, and
    wherein the monitoring device comprises at least one display device electrically powered by the electromagnetic radiation receiving means to display the state of said at least one sensor when electromagnetic radiation is received by said electromagnetic radiation receiving means.

51. An electrical apparatus comprising electrical components, wherein at least one of said electrical components is a monitoring device,
    said monitoring device comprising electromagnetic radiation receiving means connected to at least one sensor, said electromagnetic radiation receiving means for receiving electromagnetic radiation from electromagnetic emitting means, wherein:
        the electromagnetic radiation receiving means are located on a side of the electrical apparatus and are for being directed towards a support comprising means for emitting an electromagnetic radiation,
        the electromagnetic radiation receiving means is for supplying electrical power to electrical components upon receipt of electromagnetic radiation from such means for emitting electromagnetic radiation located on such support,
    the monitoring device comprises an input circuit connected to the electromagnetic radiation receiving means and an encoding circuit connected to said input circuit, and
    the monitoring device comprises display means for receiving a signal representative of a display command from the encoding circuit.

* * * * *